United States Patent
Chao

(10) Patent No.: US 7,219,221 B2
(45) Date of Patent: May 15, 2007

(54) SYSTEM AND METHOD FOR AUTOMATIC BOOTING BASED ON SINGLE FLASH ROM

(75) Inventor: Kuo Sheng Chao, Tu-chen (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 344 days.

(21) Appl. No.: 10/861,737

(22) Filed: Jun. 3, 2004

(65) Prior Publication Data

US 2004/0250058 A1   Dec. 9, 2004

(30) Foreign Application Priority Data

Jun. 3, 2003   (TW) ................ 92115109 A

(51) Int. Cl.
   *G06F 15/177*   (2006.01)

(52) U.S. Cl. ............ 713/2; 713/1; 714/5; 714/6; 714/36; 714/38; 365/185.33

(58) Field of Classification Search .......... 713/1, 713/2; 714/5, 6, 36, 38; 365/185.33
See application file for complete search history.

(56) References Cited

U.S. PATENT DOCUMENTS

| 5,210,854 | A | 5/1993 | Beaverton et al. | |
|---|---|---|---|---|
| 5,432,927 | A | 7/1995 | Grote et al. | |
| 6,473,856 | B1* | 10/2002 | Goodwin et al. | 713/2 |
| 6,591,376 | B1* | 7/2003 | VanRooven et al. | 714/36 |
| 6,978,363 | B2* | 12/2005 | Larvoire | 713/1 |
| 7,024,581 | B1* | 4/2006 | Wang et al. | 714/2 |
| 2002/0188886 | A1* | 12/2002 | Liu et al. | 714/6 |
| 2003/0005277 | A1* | 1/2003 | Harding et al. | 713/2 |
| 2004/0025002 | A1* | 2/2004 | Cepulis et al. | 713/2 |
| 2005/0251673 | A1* | 11/2005 | Bosley et al. | 713/2 |

* cited by examiner

*Primary Examiner*—A. Elamin
(74) *Attorney, Agent, or Firm*—Wei Te Chung

(57) ABSTRACT

A system and method for automatic booting based on a single flash ROM includes a flash ROM (130) and an address map circuit (120). The flash ROM is stored with a main boot code (1301) in a first address section (1303) and with a backup boot code (1302) in a second address section (1304). The address map circuit connects to a CPU (100) and the flash ROM, and includes a counter (1202) and an address decoder (1201). A related method includes the steps of: (a) a computer being powered on; (b) a CPU of the computer retrieving the main boot code and checking whether the main boot code is corrupted; and (c) the CPU retrieving the backup boot code if the main boot code is checked as corrupted.

5 Claims, 6 Drawing Sheets

SYSTEM AND METHOD FOR AUTOMATIC BOOTING BASED ON SINGLE FLASH ROM

BACKGROUND OF THE INVENTION

1. Field of the Invention

The present invention relates to boot systems and methods for computers, and more particularly to automatic booting based on a single rewritable non-volatile memory.

2. Description of Related Art

In order to start using a personal computer system, it must be switched from a "cold" or "off" status to an initiated status, in which an operating system or kernel software is loaded and control of the computer can be attained. That is, the computer is not functional in interacting with its environment or in running software applications until the operating system or kernel software has been loaded via a boot process.

Commencement of the software loading process is accomplished by a series of steps or levels. The way in which a computer utilizes such a series to get started is analogized to the computer "picking itself up by its own bootstraps." Hence the term "boot" is used to describe the process. The first level for the loading process of booting is provided in non-volatile memory (e.g. EEPROM/flash ROM), which commences at a default address. Upon power up or reboot, a computer is hard-wired to commence operation of a software routine at this address. These fixed instructions typically have just enough intelligence to seek out the next level of the program loading sequence, often stored on rotating media such as a hard disk.

The first level of booting provided in an electrically erasable programmable read-only memory (EEPROM) or a flash read-only memory (ROM) is susceptible to deletion, which results in misses. That is, because an EEPROM or a flash ROM allows users to erase existing data and rewrite new data therein, part or all of the first level of booting may be accidentally erased. In addition, the main boot segment for storing the first level of booting may be corrupted by accidental mechanical or human interference. To circumvent these problems, a system and method is needed for providing functions for automatic boot which ensure that the first level boot software can be loaded successfully.

Technology for helping administrators supervise database backup is disclosed in U.S. Pat. No. 5,432,927 issued on Jul. 11, 1995 and entitled "Fail-Safe EEPROM Based Rewritable Boot System." This patent discloses a system with two EEPROMs in a computer. One of the EEPROMs stores a boot code, and the other EEPROM stores a backup copy of the boot code for rebooting of the computer when the first boot code fails. However, the system requires two EEPROMs for providing the backup reboot, necessitating the extra cost for the additional EEPROM. Accordingly, what is needed is a new system that requires only a single non-volatile memory and which can still provide a safe reboot when a first level boot fails.

SUMMARY OF THE INVENTION

An objective of the present invention is to provide a system and method for automatic booting of a computer which can inexpensively allow a safe reboot when a first level boot fails.

Another objective of the present invention is to provide a system and method for reliable automatic booting of a computer based on a single flash ROM.

To accomplish the above objectives, a system for automatic booting based on a single flash ROM in accordance with a preferred embodiment of the present invention comprises a flash ROM and an address map circuit. The flash ROM is stored a main boot code in a first address section and a backup boot code in a second address section. The address map circuit connects to a central processing unit (CPU) and the flash ROM for enabling the CPU to automatically retrieve the backup boot code for automatic boot by switching between the first address section and the second address section of the flash ROM. Additionally, the address map circuit comprises a counter and an address decoder. The counter is used for resetting the CPU and sending a switch signal after checked the main boot code is as corrupted. The address decoder is a circuit comprising an inverter, an AND gate and a selector. the address decoder is used for receiving a plurality of address signals of the flash ROM, and the switch signal from the counter. Furthermore, the address decoder outputs an address switch signal to the CPU for enabling the CPU to retrieve the backup boot code from the second address section.

Further, the present invention provides a preferred method for automatic booting based on a single flash ROM of a computer, comprising: (a) turning on the computer; (b) a CPU retrieving a main boot code and checking whether the main boot code is corrupted; and (c) the CPU retrieving a backup boot code after the main boot code is checked corrupted.

Other objects, advantages and novel features of the present invention will be drawn from the following detailed description of preferred embodiments of the present invention with the attached drawings, in which:

DETAILED DESCRIPTION OF THE INVENTION

Figure 1:
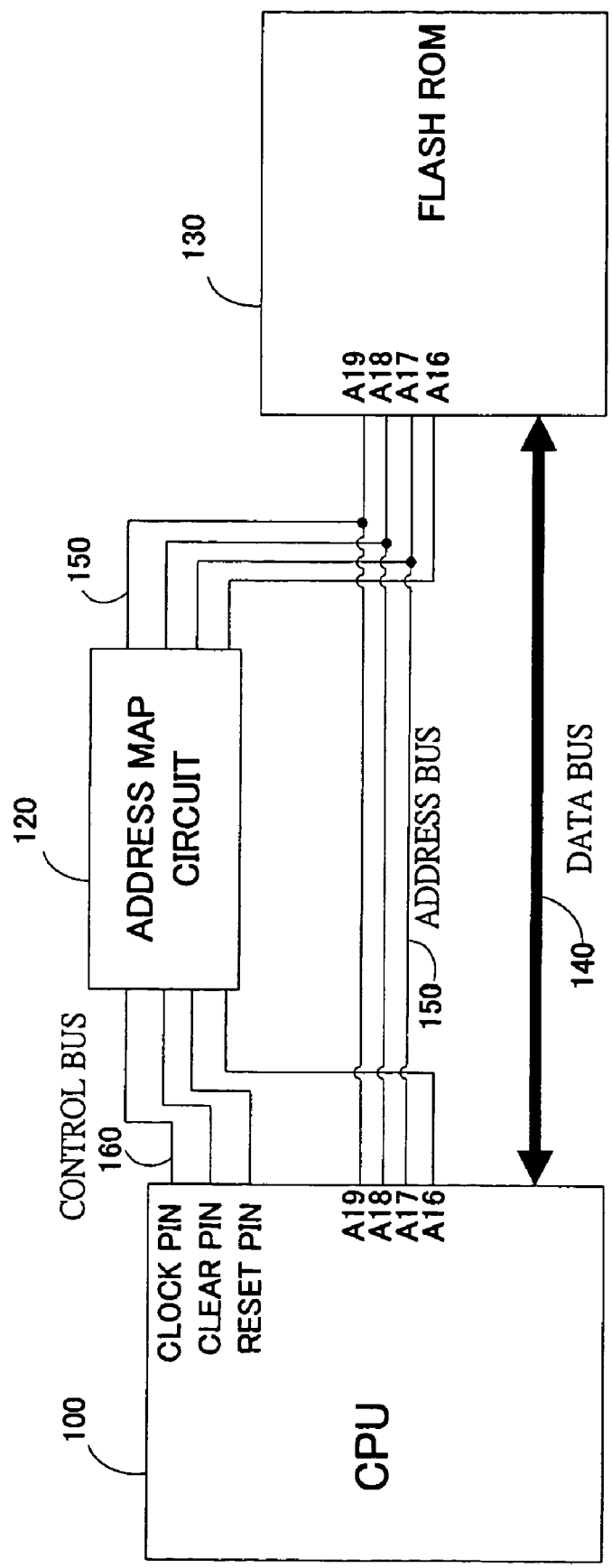
FIG. 1 is a schematic diagram of hardware infrastructure of a system for automatic booting based on a single flash ROM in accordance with the present invention.

Reference will now be made to the drawing figures to describe the present invention in detail.

FIG. 1 is a schematic diagram of hardware infrastructure of a system for automatic booting based on a single flash ROM (hereinafter, "the system") in accordance with the present invention. The system comprises a CPU 100, an address map circuit 120, a flash ROM 130, a data bus 140, an address bus 150, and a control bus 160. The CPU 100 can be an Intel® 8086 microprocessor or an equivalent thereof, which can obtain a memory address of the flash ROM 130 via the address bus 150. Thus, via the data bus 140, the CPU 100 can retrieve data stored on the memory address. The address map circuit 120 connects to pin A16 of the CPU 100 and pins A16~A19 of the flash ROM 130 via the address bus 150. Pins A17~A19 of the CPU 100 each connect to pins A17~A19 of the flash ROM 130 via the address bus 150. In addition, pins CLOCK, CLEAR and RESET of the CPU 100 all connect to the address map circuit 120 via the control bus 160.

Figure 2:
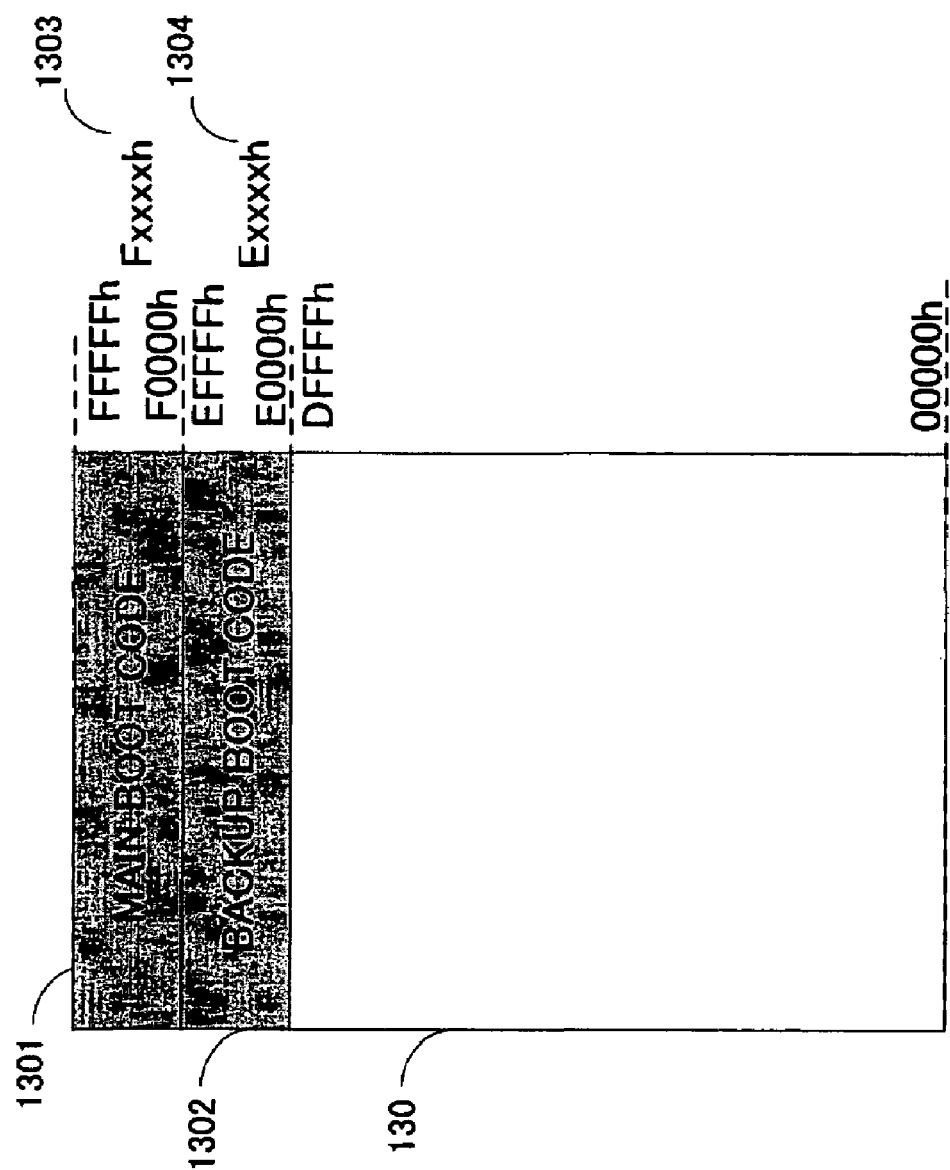
FIG. 2 is a memory map diagram of a flash ROM comprised in the system of FIG. 1.

FIG. 2 is a memory map diagram of the flash ROM 130 comprised in the system. The flash ROM 130 stores data on memory addresses from 00000h to FFFFFh (h expresses a hexadecimal figure). There is a main boot code 1301 stored on a first address section 1303 Fxxxxh (which means from F0000h to FFFFFh) and a backup boot code 1302 stored on a second address section 1304 Exxxxh (which means from E0000h to EFFFFh) of the flash ROM 130.

Figure 3:
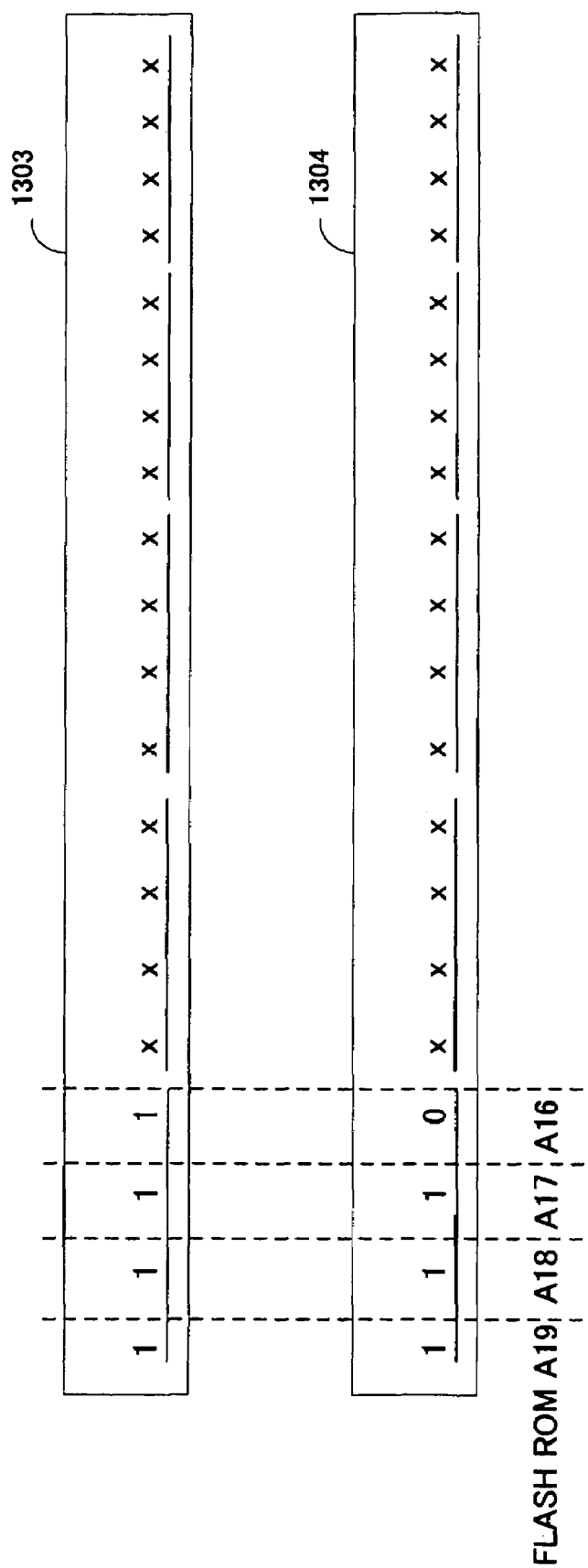
FIG. 3 is a schematic diagram of relationships between pins and stored addresses of the flash ROM of FIG. 2.

FIG. 3 is a schematic diagram of relationships between pins and stored addresses of the flash ROM 130. FIG. 3 shows the first address section 1303 and the second address section 1304 represented as 20-bit binary digital expressions. The highest 4 bits of each expression correspond with the outputs of pins A19~A16 respectively. The first address section 1303 and the second address section 1304 differ only at the output of pin A16. Consequently, the CPU 100 can switch to obtain the first address section 1303 or the second address section 1304 for booting based on the binary digital output (0 or 1) of pin A16.

Figure 4:
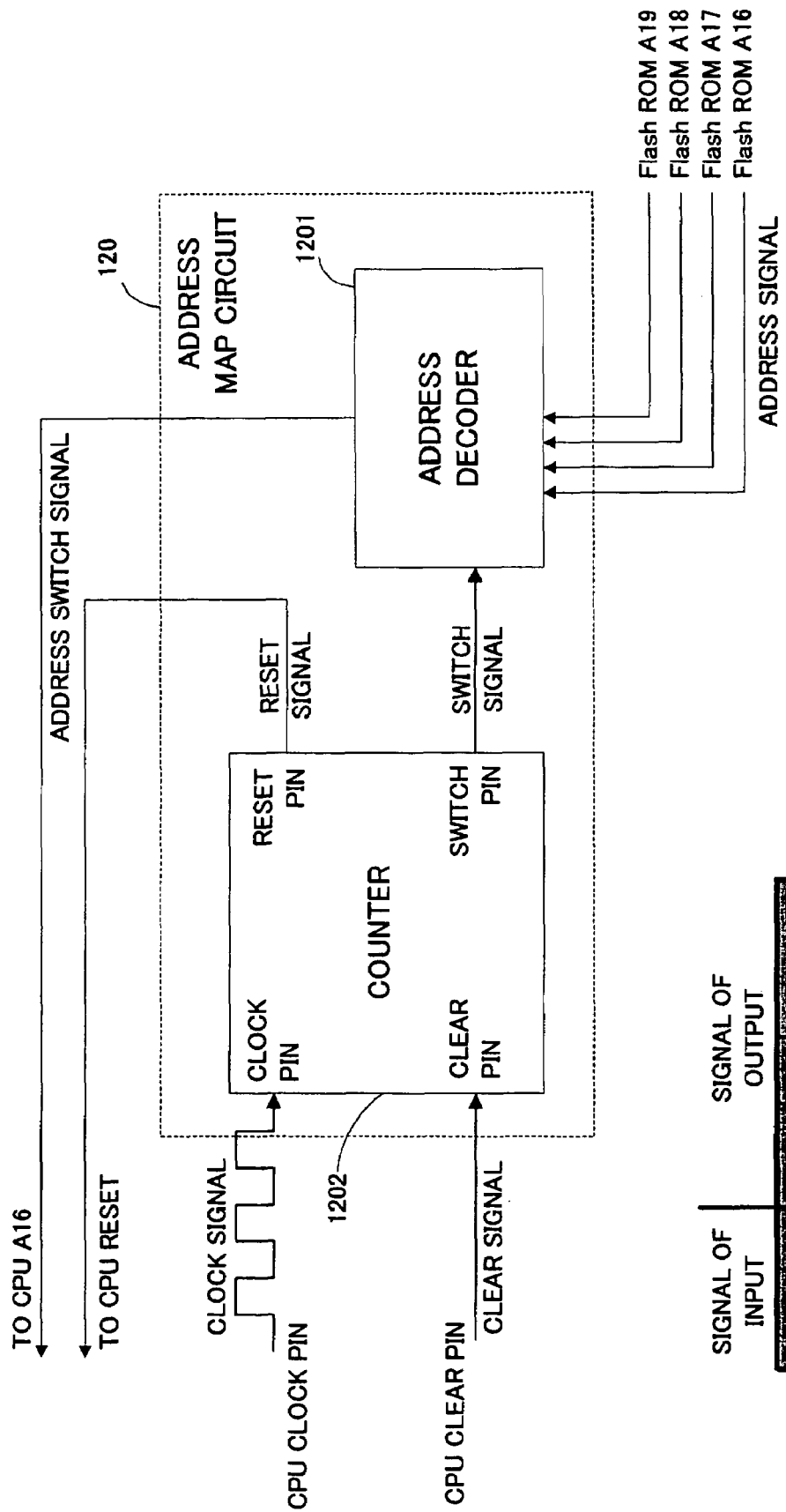
FIG. 4A is a schematic diagram of main units of an address map circuit comprised in the system of FIG. 1.
FIG. 4B is an input/output (I/O) table of a counter shown in FIG. 4A.

FIG. 4A is a schematic diagram of main units of an address map circuit comprised in the system of FIG. 1. The address map circuit 120 comprises a counter 1202 and an address decoder 1201. The counter 1202 comprises a CLOCK pin and a CLEAR pin for input, and a RESET pin and a SWITCH pin for output after a time delay. In addition, the CLOCK pin is used for receiving a clock signal from a CLOCK pin of the CPU 100. The clock signal is the basis of the time delay, and the time delay may be set as 3~5 seconds. Additionally, the CLEAR pin of the counter 1202 is used for receiving a clear signal from the CLEAR pin of the CPU 100. Furthermore, the RESET pin of the counter 1202 is used for sending a reset signal to the RESET pin of the CPU 100. The reset signal is used for instructing the CPU 100 to reboot. Moreover, the SWITCH pin is used for sending a switch signal to the address decoder 1201. The address decoder 1201 receives the switch signal and a plurality of address signals from pins A16 to A19 of the flash ROM 130, and outputs an address switch signal to pin A16 of the CPU 100.

FIG. 4B is an I/O table of the counter 1202. The I/O table shows how the clear signal influences the reset signal and the switch signal of the counter 1202. If the CPU 100 retrieves the main boot code 1301 successfully, the CLEAR pin of the CPU 100 outputs "0" for the clear signal. That is, "0" is the default value of the clear signal. Accordingly, the counter 1202 outputs 1 for the reset signal to the CPU 100 (no need to reboot), and outputs "0" for the switch signal. In contrast, if the CPU 100 retrieves the main boot code 1301 unsuccessfully, the CLEAR pin of the CPU 100 outputs "1" for the clear signal. Accordingly, the counter 1202 outputs "0" for the reset signal to instruct the CPU 100 to reboot, and outputs "1" for the switch signal to instruct the address decoder 1201 to change the output of the address switch signal after a predetermined time delay. Said time delay may be set as 3~5 seconds.

Figure 5:
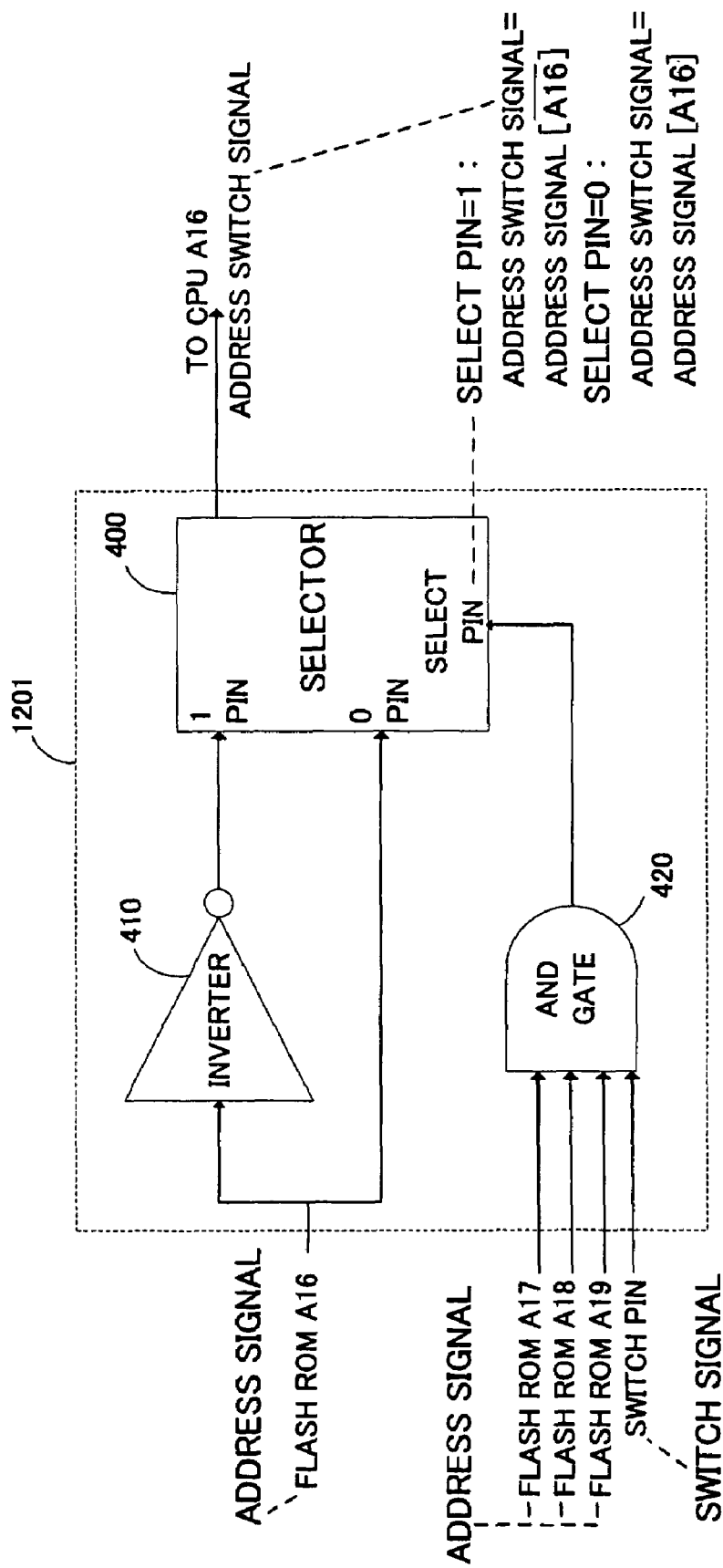
FIG. 5 is a schematic diagram of main units of an address decoder shown in FIG. 4A.

FIG. 5 is a schematic diagram of main units of the address decoder 1201. The address decoder 1201 comprises a selector 400, an inverter 410, and an AND gate 420. A plurality of address signals from pins A17~A19 of the flash ROM 130, and the switch signal from the counter 1202, are all received by the AND gate 420 for performing an AND logical operation. The AND gate 420 outputs the result of the AND logical operation to a SELECT pin of the selector 400.

A "0" pin of the selector 400 is used for receiving the address signal from pin A16 of the flash ROM 130. By contrast, a "1" pin of the selector 400 is used for receiving the reversed signal of pin A16 of the flash ROM 130 via the inverter 410. Additionally, the selector 400 outputs the address switch signal to pin A16 of the CPU 100. When any address signal of pins A17~A19 of the flash ROM 130 is "0," the CPU 100 does not retrieve the main boot code or backup boot code. Therefore, the function of fail or safe boot is not performed. Accordingly, the address signal A16 from the flash ROM 130 is bypassed from the "0" pin of the selector 400 to the output of the selector 400 as the address switch signal. When all of the address signals of pins A17~A19 of the flash ROM 130 are "1," the output of the AND gate 420 depends on the switch signal. If the switch signal is "0," the AND gate 420 outputs "0" to influence the output (address switch signal) of the selector 400 based on the input at the "0" pin (address signal of pin A16 of the flash ROM 130). If the switch signal is "1," the AND gate 420 outputs "1" to influence the output (address switch signal) of the selector 400 based on the input at the "1" pin (said input being the reversed signal from pin A16 of the flash ROM 130). Consequently the output (address switch signal) of the selector 400 instructs the CPU 100 to retrieve the backup boot code 1302 on the second address section 1304 for reboot.

Figure 6:
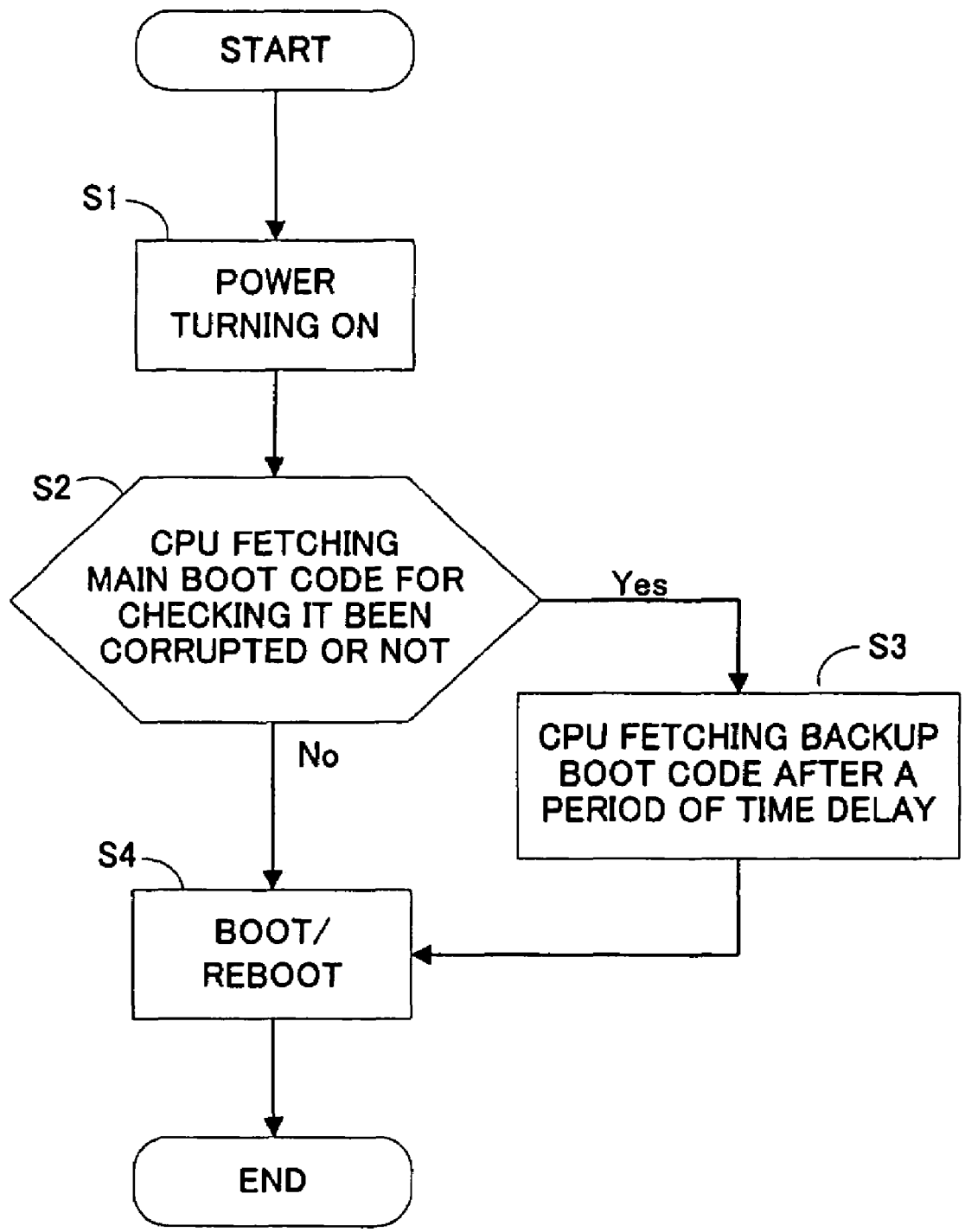
FIG. 6 is a flowchart of the preferred method for automatic booting based on a single flash ROM in accordance with the present invention.

FIG. 6 is a flowchart of the preferred method for automatic booting based on a single flash ROM in accordance with the present invention. The method includes the following steps. (a) A computer is powered on (step S1). (b) The CPU 100 of the computer retrieves the main boot code 1301, and checks whether the main boot code 1301 is corrupted (step S2). Simultaneously, the default output of the CLEAR pin of the CPU 100 is preset as "0." If the main boot code 1301 is corrupted, the procedure goes to step S3. If the main boot code 1301 is not corrupted, the procedure goes to step S4. (c) When the main boot code 1301 is corrupted, the computer cannot boot based on the main boot code 1301. Consequently, the CPU 100 changes the clear signal to "1" after a 3~5 second delay. Simultaneously, the counter 1202 outputs "0" for the reset signal to instruct the CPU 100 to reboot, and outputs "1" for the switch signal to instruct the address decoder 1201 to output "0" (as the address switch signal) to the CPU 100. Thus, the CPU 100 retrieves the backup boot code 1302 on the second address section 1304 of the flash ROM 130 (step S3). The procedure then goes to step S4. (d) The computer boots based on the main boot code 1301, or reboots based on the backup boot code 1302 (step S4).

The invention has been described in terms of a preferred embodiment and method, which are representative of only some of the various ways in which the basic concepts of the invention may be implemented. Implementation of the inventive concepts which may occur to those of ordinary skill in the art are within the scope of the invention and equivalents thereof as defined by the accompanying claims.

What is claimed is:

1. A system for automatic booting based on a single flash ROM, comprising:

a flash ROM for storing a main boot code in a first address section, and storing a backup boot code in a second address section, wherein an address of the first address section and an address of the second address section differ by a bit that is selectable by a binary digit output pin;

an address map circuit connecting to a CPU and the flash ROM for enabling the CPU to automatically retrieve the backup boot code for automatic boot by switching between the first address section and the second address section of the flash ROM with the binary digit output pin, the address map circuit comprising:

a counter for resetting the CPU and sending a switch signal after the main boot code is detected to be corrupted; and an address decoder for receiving a plurality of address signals from the flash ROM and the switch signal from the counter to enable the CPU to retrieve the backup boot code from the second address section.

2. The system for automatic booting based on a single flash ROM as claimed in claim 1, wherein the backup boot code is a backup copy of the main boot code.

3. The system for automatic booting based on a single flash ROM as claimed in claim 1, wherein the control signal comprises a clock signal and a clear signal.

4. The system for automatic booting based on a single flash ROM as claimed in claim 1, wherein the reset signal is used for instructing the CPU to reboot.

5. The system for automatic booting based on a single flash ROM as claimed in claim 1, wherein the address decoder is a circuit comprising an inverter, an AND gate, and a selector.

* * * * *